US006350891B1

(12) United States Patent
Eglin et al.

(10) Patent No.: US 6,350,891 B1
(45) Date of Patent: Feb. 26, 2002

(54) METHOD FOR MAKING A CATALYST COMPOSITION

(75) Inventors: David Eglin, Torcy (FR); Jean de la Cro Habimana, Braine le Comte (BE); Sarah Louise O'Hare, Dinas Powys; Richard Taylor, Barry, both of (GB)

(73) Assignee: Dow Corning Limited, Barry (GB)

(*) Notice: Subject to any disclaimer, the term of this patent is extended or adjusted under 35 U.S.C. 154(b) by 0 days.

(21) Appl. No.: 09/458,252

(22) Filed: Dec. 9, 1999

(51) Int. Cl.$^7$ .................................................. C07F 7/08
(52) U.S. Cl. ....................................... 556/405; 423/300
(58) Field of Search ............................ 423/300; 556/405

(56) References Cited

U.S. PATENT DOCUMENTS 4,059,559 A   11/1977   Burkhardt et al. ........ 260/448.2
4,551,317 A * 11/1985   Li .............................. 423/300
4,567,028 A *  1/1986   Tanino et al. ............... 423/300
4,795,621 A *  1/1989   Okamoto et al. ........... 423/300
5,006,324 A *  4/1991   Kolich et al. ............... 423/300
5,403,909 A *  4/1995   Rubinsztajn ............. 423/300 X

FOREIGN PATENT DOCUMENTS

GB          2252975 A      8/1992

* cited by examiner

Primary Examiner—Paul F. Shaver
(74) Attorney, Agent, or Firm—Jennifer S. Warren

(57) ABSTRACT

Phosphonitrile halides are prepared employing the use of disilazanes. The resultant products may be further reacted with cyclosiloxanes to form siloxane containing phosphonitrile halides.

9 Claims, No Drawings

METHOD FOR MAKING A CATALYST COMPOSITION

FIELD OF THE INVENTION

The present invention relates to a method for making a catalyst composition, in particular a method for making a phosphonitrile halide catalyst composition.

BACKGROUND OF THE INVENTION

Phosphonitrile halide compounds are well known in the art for use as catalysts in the preparation of organopolysiloxanes by polymerisation reactions. For example, GB patent specification 765 744 discloses the use of polymeric chlorides represented by the formula $(PNCl_2)_n$, wherein n is an integer of at least 3, most preferably 3 to 6, as preferred phosphonitrile halides for the polymerisation of liquid organosiloxanes, and GB patent specification 910 513 discloses phosphonitrile halide catalysts for use in a process for the manufacture of stabilized high viscosity polyorganosiloxane oils. Particularly preferred in the art as catalysts for polymerizing polyorganosiloxanes are those phosphonitrile halide compounds of the formula $(X(PX_2=N)_aPX_3)^+ X^-$ or the formula $(X(PX_2=N)_aPX_3)^+ (PX_6)^-$ wherein X is a halogen, preferably chlorine, and a is an integer of from 1 to 9, preferably 2. The most generally used method for making these latter phosphonitrile halide catalysts is disclosed in U.S. Pat. No. 3,839,388, which method comprises reacting phosphorous pentachloride with ammonium chloride in a high boiling point chlorinated solvent, for example trichlorobenzene, dichlorobenzene or 1,1,2,2-tetrachloroethane. However, use of such chlorinated solvents is becoming increasingly unacceptable due to their toxicity and ability to cause ozone depletion, a problem compounded with the fact that linear phosphonitrile halides have a very low solubility in most other common organic solvents. There is thus a need for an alternative route to linear phosphonitrile halides without the use of chlorinated solvents.

SUMMARY OF THE INVENTION

This invention is a method for making a phosphonitrile halide of a formula $(X(PX_2=N)_aPX_3))^+ A^-$ wherein X is a halogen, A is selected from the group consisting of X and $(PX_6)^-$, and a is an integer of from 1 to 9, comprising a first step of reacting $PX_5$ and a disilazane under cooling in an inert non-chlorinated solvent and a second step of heating the reaction mixture to at least 50° C. for a time sufficient to produce the phosphonitrile halide. The present inventors have found this route to phosphonitrile halide compounds useful as catalysts for use in the preparation of organopolysiloxanes, which route does not involve the use of chorinated solvents.

DETAILED DESCRIPTION OF THE INVENTION

According to the present invention there is provided a method for making a phosphonitrile halide of the formula $(X(PX_2=N)_aPX_3))^+ A^-$ wherein X represents a halogen, A represents X or $(PX_6)^-$, and a is an integer of from 1 to 9, which method comprises a first step of reacting $PX_5$ and a disilazane under cooling in an inert non-chlorinated solvent and a second step of heating the reaction mixture to at least 50° C. for a time sufficient to produce the phosphonitrile halide.

The method of the present invention has an advantage in that it produces substantially only linear phosphonitrile halide species, compared to the prior art method of U.S. Pat. No. 3,839,388 which produces both linear and cyclic species. Cyclic phosphonitrile halides are substantially inactive as catalysts for polymerizing polyorganosiloxanes and are thus undesirable as reaction products. The method of the present invention produces a mixture of linear phosphonitrile halide species of the above formula, the majority of product having a=1 to 3 with minor amounts of higher species, i.e. a>3. The most effective phosphonitrile halides as catalysts for polymerizing polyorganosiloxanes are those where a=2 or 3.

In the first step of the method of the present invention, the disilazane may be of the formula $R_3SiNHSiR_3$, wherein each group R is independently an alkyl group, preferably a $C_1$–$C_6$ alkyl group, more preferably a methyl group, an alkenyl group, for example a vinyl or hexenyl group, or a hydrogen atom. The preferred disilazane is hexamethyldisilazane.

In the first step of the present method, the reaction between $PX_5$ and the disilazane is performed under cooling due to the exothermic nature of the reaction. Preferably, the reaction is performed at 0° C. or below, for example by cooling with salt or solid $CO_2$, or by using a refrigerated recirculating cooling bath. The inert non-chlorinated solvent may be any solvent which does not interfere with the reaction between $PX_5$ and the disilazane, for example a non-functional solvent such as a hydrocarbon. Suitable solvents include toluene, heptane, xylene, and cyclohexane, with toluene being preferred.

In the second step of the method of the present invention, the reaction mixture prepared in the first step is heated at a temperature of 50° C. or above, for example under solvent reflux. The time required to produce the phosphonitrile halide product depends upon the reaction conditions; however, typical conditions are heating under reflux of the solvent for 1 to 4 hours. The phosphonitrile halide product separates from the solvent allowing easy removal thereof from the reaction mixture.

To increase solubilization of phosphonitrile halides in organic solvents, ease of handling, and decrease moisture sensitivity, they may be further reacted with a cyclosiloxane of the formula $((CH_3)_2SiO)_b$, wherein b is an integer of from 3 to 6, preferably 3, to afford a linear compound of the formula Z—$((CH_3)_2SiO)_b$—Z wherein Z is X or a group $OPX_2(NPX_2)_aNPX_2$— and X and a are as defined above. See, for example, the method disclosed in EP 0305737. Suitable cyclosiloxanes, for example, include hexamethylcyclotrisiloxane or octamethylcyclotetrasiloxane. The cyclosiloxane may simply be mixed with the reaction mixture formed from performance of the first and second steps described above and heated, preferably under reflux of the solvent. The reaction produces a mixture of compounds, some of which have both end groups Z as X, some have both end groups as groups $OPX_2(NPX_2)_aNPX_2$— and some have one endgroup as X and the other as $OPX_2(NPX_2)_aNPX_2$—. The catalytically active species have at least one phosphonitrile endgroup, i.e. at least one endgroup Z as $OPX_2(NPX_2)_aNPX_2$—. The phosphonitrile halide containing species are soluble in some organic solvents, for example, ethylene glycol diacetate, which particular solvent has the advantages of being inert towards the phosphonitrile halide containing species and being very soluble in siloxanes. The solution which results from dissolving said phosphonitrile halide containing species in ethylene glycol diacetate is stable over time and the dissolved phosphonitrile halide containing species can retain catalytic activity for several months. The above described reactions may be represented schematically as follows:

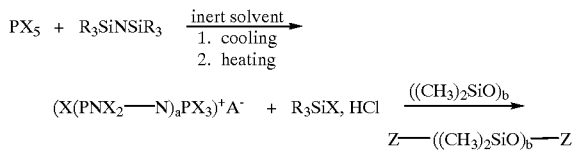

wherein R, X, Z, a and b are as defined above.

EXAMPLES

Comparative Example 4.83 g (29.94 mmol) of hexamethyldisilazane (HMDZ) was added to a 100 ml flask containing 9.56 g (46.4 mmol) of $PCl_5$ and 50 ml of anhydrous toluene. The mixture was heated under reflux for 2 hours under a nitrogen atmosphere. The reaction product showed two phases; an upper colorless liquid phase and a lower yellow solid phase. The upper liquid phase was removed by distillation. $^{31}P$ NMR studies on the solid phase confirmed the presence of the desired linear phosphonitrile chloride species $(Cl(PNCl_2=N)_aPCl_3)^+$ $A^-$ (wherein A is a mixture of $Cl^-$ and $(PCl)^-$) in amounts of 2% mol for a=1, 23% mol for a=2, 37% mol for a=3, and 12% mol for a≧4, together with 10% mol cyclics.

Example 1

8.72 g (41.8 mmol) of $PCl_5$ and 40 ml of toluene were mixed in a flask, which was cooled with solid carbon dioxide prior to dropwise addition of 4.50 g (27.92 mmol) HMDZ. The flask was then allowed to warm to room temperature and left to stand for 20 minutes prior to heating under reflux for 2 hours. The product had a yellow transparent liquid phase and a yellow solid phase. The solvent was removed to leave a yellow solid which crystallized on cooling. $^{31}P$ NMR studies confirmed the presence of the linear phosphonitrile chloride species $(Cl(PNCl_2=N)_aPCl_3)^+$ $A^-$ (wherein A is a mixture of $Cl^-$ and $(PCl_6)^-$) in amounts of 2% mol for a=1, 18% mol for a=2, 40% mol for a=3, and 26% mol for a≧4, with 1% mol cyclics.

Example 2

60.26 g (289.71 mmol) of $PCl_5$ and 250 ml toluene were mixed in a flask, which was cooled using solid carbon dioxide prior to adding dropwise 31.17 g (193.14 mmol) of HMDZ. After the addition, the flask was allowed to warm to room temperature and stand for 10 minutes prior to heating under reflux for 2 hours. The product showed a clear liquid toluene phase and a yellow liquid phosphonitrile chloride containing phase. The toluene was removed and the yellow product was crystallized and analyzed by $^{31}P$ NMR. The product contained the linear phosphonitrile chloride species $(Cl(PNCl_2=N)_aPCl_3)^+$ $A^-$ (wherein A is a mixture of $Cl^-$ and $(PCl_6)^-$) in amounts of 2% mol for a=1, 15% mol for a=2, 39% mol for a=3, and 22.9% mol for a≧4, with 1% mol cyclics.

A solution of 25.58 g (115.2 mmol) of anhydrous $D_3$ in 15 ml toluene was then added to the flask and reaction continued under reflux overnight for 15 hours. The toluene was then removed to leave a yellow liquid which was analysed by 31P and $^{29}Si$ NMR. These studies showed the presence of $OCl_2PNPCl_2NPCl_2OSi$— groups.

That which is claimed is:

1. A method for making a phosphonitrile halide of a formula $(X(PX_2=N)_aPX_3))^+$ $A^-$ wherein X is a halogen, A is selected from the group consisting of X and $(PX_6)^-$, and a is an integer of from 1 to 9, comprising a first step of reacting $PX_5$ and a disilazane under cooling in an inert non-chlorinated solvent and a second step of heating the reaction mixture to at least 50° C. for a time sufficient to produce the phosphonitrile halide.

2. A method according to claim 1 wherein the disilazane is hexamethyldisilazane.

3. A method according to claim 1 wherein X is chlorine.

4. A method according to claim 1 wherein the first step is performed at a temperature of 0° C. or less.

5. A method according to claim 1 wherein the second step is performed under reflux of the solvent.

6. A method according to claim 1 wherein the solvent is toluene.

7. A method according to claim 1 which further includes a third step of adding a cyclosiloxane of the formula $((CH_3)_2SiO)_b$, wherein b is an integer of from 3 to 6, to the reaction mixture resulting from the second step to form a phosphonitrile halide containing species of the formula $Z$—$((CH_3)_2SiO)_b$—$Z$ wherein Z is selected from the group consisting of X and a group $OPX_2(NPX_2)_aNPX_2$—, the phosphonitrile halide containing species having at least one group of the formula $OPX_2(NPX_2)_aNPX_2$—.

8. A method according to claim 7 wherein the cyclosiloxane substantially consists of hexamethylcyclotrisiloxane.

9. A method according to claim 7 wherein the phosphonitrile halide containing species is dissolved in ethylene glycol diacetate.

* * * * *